United States Patent [19]

Winkler

[11] 4,033,779
[45] July 5, 1977

[54] NON-EQUILIBRIUM CORDIERITE-ALUMINA

[75] Inventor: Ernel R. Winkler, Scottsdale, Ariz.

[73] Assignee: Corning Glass Works, Corning, N.Y.

[22] Filed: Mar. 23, 1976

[21] Appl. No.: 669,689

[52] U.S. Cl. .................................. 106/62; 106/73.4; 106/39.6

[51] Int. Cl.² .................. C04B 35/18; C04B 35/20; C03C 3/22

[58] Field of Search ............. 106/62, 65, 73.4, 39.6

[56] References Cited

UNITED STATES PATENTS

| | | | |
|---|---|---|---|
| 3,450,546 | 6/1969 | Stong | 106/39.6 |
| 3,849,145 | 11/1974 | Pitha | 106/39.6 |
| 3,885,977 | 5/1975 | Lachman et al. | 106/73.4 |
| 3,950,175 | 4/1976 | Lachman et al. | 106/62 |
| 3,979,216 | 9/1976 | Fritsch, Jr. et al. | 106/73.4 |

*Primary Examiner*—Winston A. Douglas
*Assistant Examiner*—Mark Bell
*Attorney, Agent, or Firm*—Richard N. Wardell; Clarence R. Patty, Jr.

[57] ABSTRACT

Non-equilibrium sintered ceramics, having a matrix composition near stoichiometric cordierite and undissolved intermediate size alumina particles distributed throughout the matrix, display increased temporary use temperatures over the matrix composition by itself without physical deformation associated with melting. Thermal expansion of the non-equilibrium composition is not excessively higher than the cordierite matrix if the proper size alumina is used.

3 Claims, 1 Drawing Figure

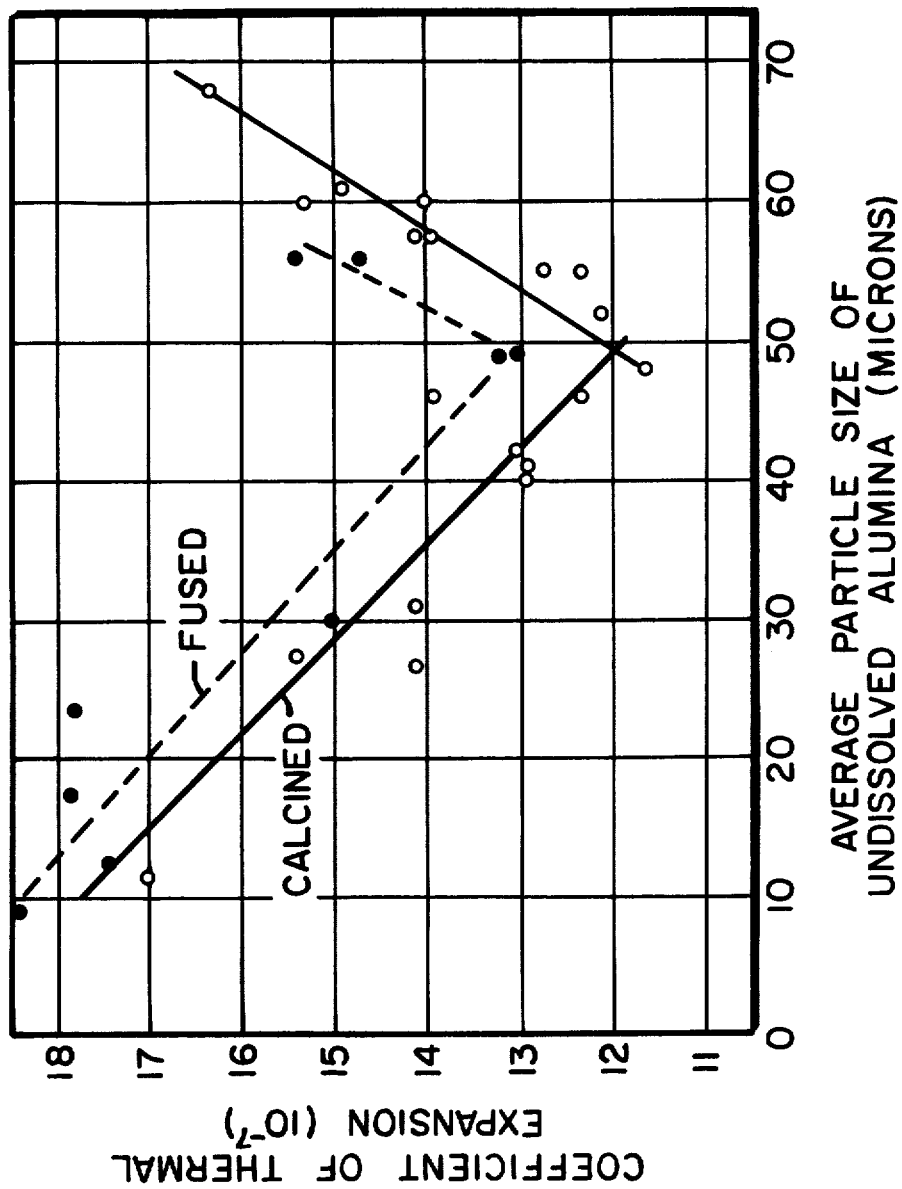

NON-EQUILIBRIUM CORDIERITE-ALUMINA

BACKGROUND OF THE INVENTION

Cordierite ceramics are useful in systems where rapid temperature changes take place because crystalline cordierite has a very low thermal expansion. In particular, cordierite may be successfully used as a catalyst support in many catalytic systems including the automobile pollution control catalytic converter.

Unfortunately, cordierite has a fairly low melting point and is not useful for even short periods at temperatures greater than about 1500° C because of melting and resulting physical deformation. Other ceramic materials which are more refractory than cordierite and would have higher prolonged use temperatures (e.g. alumina), unfortunately have much higher expansions (alumina about $88 \times 10^{-7}$ in/in/° C), and are more adversely affected by a thermal shock. For example, in an automobile exhaust system, temperatures may rise very quickly to very high temperatures for short periods of time during start up and then drop and level off to operating temperatures of around 800°–1000° C. The thermal "spikes," as these short temperature excursions are named, can locally melt a low-expansion, moderately refractory material such as cordierite or can fracture a higher expansion, highly refractory material such as alumina or zirconia.

SUMMARY OF THE INVENTION

It is an object of the present invention to provide sintered ceramic compositions which have low coefficients of thermal expansion and yet retain their physical integrity during high temperature thermal excursions (spikes).

In particular, it is an object of the present invention to modify low expansion, state-of-the-art, cordierite compositions to raise the temporary use temperature of the compositions without significantly decreasing the thermal shock resistance.

In accordance with the objectives, the invention is a non-equilibrium sintered ceramic composition consisting essentially of a fine-grained matrix of predominantly crystalline cordierite and an effective amount up to 70%, by weight based on the matrix weight, of an undissolved intermediate alumina distributed within the matrix for increasing the temporary use temperature of the matrix without an increase in the coefficient of thermal expansion of the composition proportionate to the alumina addition, and wherein the particle size of substantially all of the intermediate alumina is between about 25 and 149 microns (−100 + 500 Tyler mesh) and the average particle size is between about 40 and 60 microns, preferably 45–55 microns. Other phases such as mullite, spinel or sapphirine may occur in minor amounts in the matrix (preferably less than a total of 5 weight percent) however these phases tend to increase the expansion of the matrix and should be avoided. Many of the intermediate size (−100 + 500 Tyler mesh) alumina particles reside in "holes" in the matrix which are formed as the higher expansion undissolved alumina particle contracts away from the matrix upon cooling from the sintering temperature. The hole or the alumina particle may have a reaction rim or layer of mullite associated therewith due to some reaction at sintering temperature between the particle surface and the matrix composition. Nevertheless, it is this hole which apparently allows the non-equilibrium body to retain its low thermal expansion since it represents internal volume in which the individual alumina particles may expand during heating of the composition without adding to the overall external expansion of the composition.

In the preferred compositions, the alumina particles comprise up to about 25% by weight based on the weight of the cordierite matrix and are about 25–74 microns in size (−200 + 500 Tyler mesh) and have an average particle size of between about 45 and 55 microns. Smaller particles tend to react (dissolve) and the very large particles tend to fracture internally at sintering temperatures, both tendencies contributing to detrimental higher thermal expansions of the overall body.

DETAILED DESCRIPTION OF THE INVENTION

Sintered ceramic compositions of near cordierite stoichiometry ($2MgO·2Al_2O_3·5SiO_2$) have prolonged use temperatures, as hereinafter defined, of about 1500°–1525° C. Other phases such as mullite, spinel, or sapphirine may be produced by adding additional MgO or $Al_2O_3$ to a raw batch prior to sintering, but the increase in use temperature occasioned by the presence of these more refractory phases is offset by an increase in the thermal expansion of the body substantially proportional to the volume of the additional phases and their higher coefficients of thermal expansion. Consequently, though it may be known that the addition of more refractory phases can increase the refractoriness of a cordierite body, it is also known that the thermal expansion (and physical stress during thermal shock) increases.

The present inventor has now found that through the refractoriness (prolonged use temperatures) may not be increased without an increase in the thermal expansion, the temporary use temperature can be raised considerably by the incorporation of a finely divided, undissolved alumina phase within the essentially cordierite matrix or base composition, which will enable these materials to withstand brief excursions of temperature up to well beyond the cordierite melting point and in the neighborhood of about 1650° C.

Matrix compositions which consist essentially of crystalline cordierite may be used in the present invention and are identified, on the oxide basis and by weight, as consisting of 41–56% $SiO_2$, 30–50% $Al_2O_3$ and 9–20% MgO and preferably 48–51.6% $SiO_2$, 34.2–39.5% $Al_2O_3$ and 12.5–15.5% MgO. These limits are essentially those which are disclosed in U.S. Pat. No. 3,885,977, as good low expansion materials for catalyst supports. The present invention therefore represents an improvement over those materials in that the disclosure in U.S. Pat. No. 3,885,977 relates to the base or matrix materials of this invention.

The mechanism which operates to raise the temporary use temperature is believed, though not proved, to be the absorption of energy by the body as it proceeds to equilibrium and the reaction of undissolved alumina particles with the cordierite matrix to form mullite. Additionally, there may be a physical effect as more alumina is added, the inert alumina acting as a skeleton which remains relatively stiff even though the matrix is softening.

The size of the alumina particles is critical to retaining the low thermal expansion of the matrix material in a sintered body. Very fine particles on the order of −500 Tyler mesh (25 microns) tend to react (to equilibrium) easily with the matrix material at the sintering temperature of the matrix, thereby forming the undesirable second phases which increase the thermal expansion of the body. Even if these particles do not react completely, for example, due to a short soak time at sintering temperatures, the undissolved particles still adhere to the matrix and the expansion of the alumina particles contribute to the external expansion of the body.

Furthermore, alumina particles which are larger than about 125 microns (+200 Tyler mesh), and especially if they are larger than about 149 microns (+100 Tyler mesh), tend to react somewhat at the particle surface to form a reaction rim of high mullite concentration, but primarily the large particles have substantial porosity and also crack internally so that fragments adhere to the solution rim and participate in the expansion of the entire body.

On the other hand, undissolved alumina particles which are between about 25 and 149 microns and preferably 25 to 125 microns (more preferably 25–74 microns) in diameter react at matrix sintering temperatures with the matrix to form a solution rim, but upon cooling, the difference in coefficients of thermal expansion (contraction) between the alumina particle and the matrix causes cracking in this solution rim and the alumina particle contracts away from the larger "cavity" in the matrix. It is believed that, consequently, the alumina particle rattles around in the solution cavity and upon heating of the body, the alumina particle can expand internally (within the cavity) and not contribute to the external expansion of the body.

Finer or coarser alumina than the preferred size can be tolerated in the final body but are preferably avoided since they tend to increase the thermal expansion as well as the use temperature. However, efficient production processes and raw material costs indicate that it may be necessary to include some of the undesirable fractions, especially the extra fines. Larger particles can be scalped from the raw material and further reduced in size but the extra fines (−500 Tyler mesh), which can make up about 25% of a commercial calcined alumina raw material (−100 Tyler mesh Alcoa T-61), may have to be used for the sake of economy instead of being discarded. The −100 mesh Alcoa T-61 alumina is about 43% −200 + 500 and has an average particle size of 55 microns.

The alumina particle distribution is preferably continuous across the size limits (that is, without gaps of greater than 10 microns, for example) and the average particle size is between about 40 and 60 microns. The distribution across the particle size limits will therefore be balanced and will include the size of particle (about 25–74 microns) which cracks away from the matrix and which does not contribute significantly to the thermal expansion of the matrix body.

DESCRIPTION OF THE PREFERRED EMBODIMENTS

Preparation of ceramic honeycombed matrices is well described in U.S. Pat. No. 3,885,977 and 3,790,654 which are incorporated herein by reference. Preferred base or matrix compositions for the present invention are also given in the former U.S. patent. In general, whether honeycombs or any other shape bodies are formed of the materials of the invention, the preparation of the bodies is according to common ceramic processes. Raw materials yielding the base cordierite compositions upon sintering are batched with the desired amount of larger raw, calcined or fused alumina, together with forming aids, binders and water as required, and are blended, formed, dried if necessary, and fired in the range of 1374°–1425° C. for about 6 hours or for a time sufficient to bring about the development of the crystalline cordierite matrix.

Temporary use temperature is basically a relative measure of the ability of a ceramic sample to retain its physical integrity at high temperatures for short periods of time. In the case of a catalyst support for automotive emission control, the time would be a practical limit indicative of the maximum duration thermal spike expected during operation.

In the laboratory and in the Examples, the temporary use temperature is defined as the highest temperature a 2 cm² sample could withstand when placed in a preheated furnace for 90 seconds without melting, i.e. sagging more than about 10% or shrinking linearly more than 25%. Prolonged use temperature is the highest temperature at which a composition would withstand without deformation over extended periods of use (e.g. hours) and would normally be equal to the melting temperature of the composition. The temporary are prolonged use temperatures would generally be equal for an equilibrium body and the prolonged use temperatures would generally be equal for non-equilibrium and equilibrium bodies of the same chemical composition since the non-equilibrium body will eventually reach equilibrium over prolonged exposure to the high temperatures.

EXAMPLE 1

A honeycomb body with a base composition, denoted composition "A" has an axial thermal expansion coefficient of $10.9 \times 10^{-7}$ in/in/° C over the range 20°–1000° C and a temporary use temperature of about 1500° C. Composition A is made from a raw material batch of 40.0% Hydrite MP clay, 38.0% talc and 22.0% hydrated alumina (average particle size of 1.4 microns) blended with 0.5% diglycol stearate and 6.67% methyl cellulose (Dow Chemical's Methocel MC 4000). The batch is mixed and extruded into a honeycombed matrix, dried and fired to 1400° C for 6 hours on a schedule of: 50° per hour to 300° C, hold 1 hour and then 100° C per hour to the peak temperature. On the normalized oxide basis by weight, the body was about 49.4%, $SiO_2$, 35.9% $Al_2O_3$ and 14.7% MgO.

The effect of added alumina fractions with two different size limits was observed by adding −100 mesh calcined alumina with an average particle size (hereinafter APS) of 55 microns to one set of samples and −325 mesh calcined alumina having an APS of 27.5 microns to another set. Calcined alumina was added as 50% by weight of the base composition. Fused silica (20% by weight based on the base composition weight) with a particle size of −100 + 200 mesh was also added to increase the coarse porosity of the matrix composition. Honeycombed bodies were made from the batches and fired to 1400° C and to 1350° C on the previously mentioned schedule, with a 6 hour soak. A summary of the results is shown in Table 1.

TABLE I

| Excess Alumina Addition Particle Size | Firing Temperature | Temporary Use Temperature | Expansion Coefficient ($10^{-7}$) |
|---|---|---|---|
| None (Base composition) | 1400° C | 1500° C | 10.9 |
| −100 mesh, | 1400° C | 1550° C | 15.2 |

TABLE I-continued

| Excess Alumina Addition Particle Size | Firing Temperature | Temporary Use Temperature | Expansion Coefficient ($10^{-7}$) |
|---|---|---|---|
| APS = 55 | 1350° C | 1610° C | 16.0 |
| −325 mesh | 1400° C | 1605° C | 24.9 |
| APS = 27.5 | 1350° C | 1600° C | 25.6 |

At both firing temperatures mullite was more in evidence in the bodies which were batched with the −325 mesh alumina and contributed to much higher expansions and some gain in use temperature. Small amounts of spinel were also found in both sets of samples, however, the undissolved −100 mesh material still only raised the expansion about 5 points while raising the use temperature as much as 110° C.

EXAMPLE 2

Ceramic honeycombined matrices were made using a base composition "B" and also using composition 1, which is the base composition B with an additon of 59.4% −100 mesh calcined alumina and 1.45% −100 + 200 mesh fused silica for increasing coarse porosity (both by weight based on the weight of the base composition). The base composition was formed from a raw batch of about 21.7% delaminated kaolin clay, 39.2% talc, 17.8% hydrated alumina (APS = 1.4), 11.2% −325 mesh alumina and 10.0% −200 mesh silica. A binder of 4.5% methyl cellulose and a forming acid of 0.5% diglycol stearate were added to all batches during processing. The two compositions were prepared and fired, as was a composition 2 which was formulated identically with the composition 1 but using 59.4% additional hydrated alumina (APS = 1.4) and 1.45% additional −300 mesh silica in place of the coarser alumina and silica additions. Therefore, when sintered, composition 2 is the equilbrium counterpart of the non-equilibrium composition 1 of the invention. Composition B has a fired oxide analysis of about 14.5% MgO, 35.9% $Al_2O_3$ and 49.6% $SiO_2$, which is on the higher alumina side but very close to stoichiometric cordierite.

TABLE II

| Composition | Firing Temperature and Schedule | Expansion Coefficient ($10^{-7}$) | Temporary Use Temperature |
|---|---|---|---|
| B | 1415° C., slow | 6.6 | 1525° C. |
| 1 | 1415° C., slow | 19.4 | 1600–1650° C. |
| (non-equilibrium) | 1415° C., fast | 19.2 | not measured |
| | 1445° C., slow | 39.6 | >1650° C. |
| | 1445° C., fast | 22.7 | 1600–1650° C. |
| 2 | 1415° C., slow | 45.4 | 1600–1650° C. |
| (equilibrium) | 1415° C., fast | 44.0 | >1650° C. |
| | 1445° C., slow | 64.7 | >1650° C. |

The slow firing schedule was 50° C per hour to 800° C, thereafter 40° C per hour to the peak temperature. The fast schedule was 100° C per hour to the peak temperature. Both schedules had 6 hour holds at the peak temperature.

It is evident that the temporary use temperature is raised at least 75°–125° C by both the coarse and the fine alumina additions in compositions 1 and 2. It is also evident from the data and from microscopic examination, however, that more of the coarse alumina remained undissolved in composition 1 and that especially the alumina particles in the size range of 25–74 microns cracked away from cavities in the cordierite matrix and could not significantly contribute to the overall expansion of the body. The finer alumina in composition 2 reacted substantially in all firing schedules and contributed to a very high thermal expansion coefficient.

The cordierite matrix composition B should be fired no higher than about 1415° C to avoid melting and formation of glass. It can be seen that firing the non-equilibrium compositions slowly to higher temperatures can cause more of the alumina to react and thereby increase the thermal expansion rapidly along with the use temperature. This reaction should be avoided in practicing the invention and the normal firing temperature of the matrix (base composition) should be used for the compositions of the invention. The firing temperature and schedule should be determined as the minimum heat necessary to substantially react the matrix composition to crystalline cordierite. If the matrix is not fully reacted to cordierite, it will have a higher thermal expansion than cordierite.

On a volume basis, the −100 mesh calcined alumina makes up approximately 30.8 volume percent of the total composition 1, so that a coefficient of expansion proportionate to the volume of phases (which may be a relative approximation of the true coefficient) would be on the order of 31.8 using 6.6 for the matrix and 88 for the alumina phase and ignoring other phases. Some of the expansions in Table II are higher than 31.8 because of the presence of additional phases like spinel (expansion coefficient of about 76) and mullite (expansion coefficient of about 53).

EXAMPLE 3

Ceramic honeycombed matrices of composition B were again compared with 1.) bodies having composition 3, which have a matrix of composition B and 45.8% −100 mesh calcined alumina and 23.0% −100 + 200 mesh fused silica therein, and 2) bodies having composition 4, which have the same oxide analysis as bodies of composition 3 but are again made using 1.4 APS hydrated alumina and −200 mesh silica in place of the coarser additions, i.e. 4 is the equilibrium counterpart of 3 at the sintering temperatures of the matrix.

TABLE III

| Composition | Firing Temperature and Schedule | Expansion Coefficient ($10^{-7}$) | Temporary Use Temperature |
|---|---|---|---|
| B | 1415° C., slow | 6.6 | 1525° C. |
| 3 | 1415° C., slow | 20.7 | >1600° C. |
| (non-equilibrium) | 1415° C., fast | 19.2 | 1550° C. |
| 4 | 1415° C., slow | 26.0 | 1500° C. |
| (equilibrium) | 1415° C., fast | 28.7 | 1500° C. |

In this case the 45.8% excess alumina (based on the weight of the matrix) raised the temporary use temperature at least 25°–75° C while the thermal expansion coefficient increased moderately in the non-equilibrium body. However, the more equilibrium composition 4 showed even higher expansions and lower temporary use temperatures, again confirming the superiority of the undissolved alumina over the reacted alumina in the sintered bodies. Microscopic investigation evidenced the undissolved alumina particles within cavities in composition 3, whereas there was no significant undissolved alumina phase in composition 4 since it was fairly reacted with the matrix materials.

EXAMPLE 4

To show the effect of average particle size (i.e. the distribution of the particles within the particle size ranges of the invention), several honeycombed matrices were prepared as above using base compositions A and variously sized additions of 14.3% calcined or fused alumina by weight based on the weight of the base composition. The raw batches were mixed, blended and extruded into honeycombed matrices and dried as above and were fired to 1400° C for 6 hours. A T-61 Alcoa calcined alumina and an Exolon WW fused alumina were screened to various fractions and the average particle size of each of the fractions was determined using a Coulter counter and is recorded below. Due to sampling errors and measuring equipment limitations, the average particle size may be accurate within about ±10%, as evidenced by the anomolous results for the −120, −140, and −170 fractions of calcined alumina. These fractions were added to the base composition and the thermal expansion coefficient of the resulting sintered compositions were determined and plotted against the APS of the added fraction. The graph of the results is shown in the FIGURE with the solid line representing the calcined alumina additions and the broken line the fused alumina additions.

TABLE IV

| Tyler Mesh Size | T-61 Calcined Alumina | |
|---|---|---|
| | Mesh Opening (microns) | Average Particle Size (microns) |
| −100 | 149 | 55 |
| −120 | 125 | 41 |
| −140 | 105 | 40 |
| −170 | 88 | 42 |
| −200 | 74 | 31 |
| −325 | 44 | 27.5 |
| −500 | 25 | 11.5 |

| Tyler Mesh Size | Average Particle Size (microns) |
|---|---|
| −100 +200 | 68 |
| −100 +325 | 57 |
| −100 +500 | 46 |
| −120 +325 | 68 |
| −120 +500 | 46 |
| −140 +325 | 61 |
| −140 +500 | 52 |
| −200 +325 | 60 |
| −200 +500 | 48 |
| −325 +500 | 25 |

TABLE IV-continued

| Tyler Mesh Size | T-61 Calcined Alumina Exolon Fused Alumina Average particle Size (microns) |
|---|---|
| −220 | 56 |
| −240 | 49 |
| −280 | 30 |
| −320 | 23.5 |
| −400 | 17.5 |
| −500 | 12.5 |
| −600 | 9.2 |

Looking at the FIGURE it is seen that a minimum is reached in both curves in about the 40–60 micron APS range. All the fused alumina fractions contained the extra fine particles which react most easily to second phases, so the curve is shifted slightly upwards from the calcined alumina curve. The actual expansions for the bodies using the fused alumina fractions agree generally with the expansions of the bodies using the same calcined alumina fractions containing extra fines. Again, the extra fines are tolerable, but they dilute the benefit of the excess alumina additions in the 25–74 micron particle range of the invention.

In the foregoing specification, unless otherwise indicated, percentages are on the weight basis and mesh sizes are according to the Tyler Standard sieve series. Thermal expansion coefficients are reported for the temperature range 20°–1000° C.

I claim:

1. A non-equilibrium sintered ceramic composition consisting essentially of a fine-grained matrix of crystalline cordierite and an effective amount up to about 70%, by weight based on the matrix weight of undissolved, 25–149 micron diameter alumina particles with an average particle size of between about 40 and 60 microns, for increasing the temporary use temperature of the matrix without increasing the coefficients of thermal expansion of the composition proportionally to the added alumina.

2. The non-equilibrium composition of claim 1 wherein the undissolved alumina particles have an average particle size of 45–55 microns.

3. The non-equilibrium composition of claim 1 wherein the undissolved alumina particles are between about 25 and 74 microns in diameter.

* * * * *